(12) United States Patent
Chen et al.

(10) Patent No.: US 11,716,803 B2
(45) Date of Patent: Aug. 1, 2023

(54) METHOD AND APPARATUS FOR CONTROLLING DEVICE, SMART HOME DEVICE, SYSTEM, AND STORAGE MEDIUM (71) Applicant: SAVANT TECHNOLOGIES LLC, East Cleveland, OH (US)

(72) Inventors: Weihu Chen, Shanghai (CN); Guangting Guo, Shanghai (CN); Hong Zhao, Shanghai (CN); Jinpeng Hu, Shanghai (CN); Mathew Sommers, East Cleveland, OH (US)

(73) Assignee: SAVANT TECHNOLOGIES LLC ( * ) Notice: Subject to any disclaimer, the term of this patent is extended or adjusted under 35 U.S.C. 154(b) by 0 days.

(21) Appl. No.: 17/482,227

(22) Filed: Sep. 22, 2021

(65) Prior Publication Data

US 2022/0174800 A1 Jun. 2, 2022

(30) Foreign Application Priority Data

Nov. 27, 2020 (CN) .......................... 202011359414.5

(51) Int. Cl.
H05B 47/12 (2020.01)
G06F 3/16 (2006.01)
H05B 45/20 (2020.01)
H05B 45/10 (2020.01)
G10L 15/22 (2006.01)

(52) U.S. Cl.
CPC ............. *H05B 47/12* (2020.01); *G06F 3/165* (2013.01); *G06F 3/167* (2013.01); *G10L 15/22* (2013.01); *H05B 45/10* (2020.01); *H05B 45/20* (2020.01); *G10L 2015/223* (2013.01)

(58) Field of Classification Search
CPC ........ H05B 47/12; H05B 45/20; H05B 45/10; G06F 3/167; G10L 15/22; G10L 2015/223
See application file for complete search history.

(56) References Cited

U.S. PATENT DOCUMENTS

2016/0084869 A1 * 3/2016 Yuen ...................... A63B 60/46
  73/510
2018/0367483 A1 * 12/2018 Rodriguez .............. H04L 65/60
2020/0367006 A1 * 11/2020 Beckhardt ............... H04S 3/008

FOREIGN PATENT DOCUMENTS

CN    101573976 A  * 11/2009  .......... H04N 21/235
CN    107103316 A  *  8/2017  .......... G06F 3/0482
WO    WO-8701851 A1 *  3/1987

* cited by examiner

*Primary Examiner* — Abdullah A Riyami
*Assistant Examiner* — Syed M Kaiser
(74) *Attorney, Agent, or Firm* — Wood IP LLC (57) ABSTRACT The present application relates to a method and an apparatus for controlling a device, a smart home device and system and a storage medium the device may be a lighting device. The method for controlling a device comprises: receiving a data stream including data for playing audio; acquiring reference data corresponding to a device control command controlling the device to perform one or more functions; determining whether at least a portion of the data in the data stream matches the reference data; and controlling, in case at least a portion of the data in the data stream matches the reference data, the device to perform one or more of the functions according to the corresponding device control command.

21 Claims, 6 Drawing Sheets

METHOD AND APPARATUS FOR CONTROLLING DEVICE, SMART HOME DEVICE, SYSTEM, AND STORAGE MEDIUM

TECHNICAL FIELD

The present application relates to the field of smart home controlling, and in particular, to a method and an apparatus for controlling a device, a smart home device, system, and a storage medium.

BACKGROUND

With the continuous progress of science and technology, the application of smart home device is more and more extensive, and its functions have become diversified. For example, audio lamps can not only realize the general functions of lamps, but also play music. However, various functions lead to high operation complexity. Usually, one remote controller is required to control the lighting and brightness level of the audio lamp, and a music player is also required to control the built-in audio of the lamp to play music, etc. This makes its application complicated and its manufacturing cost high.

SUMMARY

Embodiments of the present application provide a method and an apparatus for controlling a device, a smart home device, system, and a storage medium, so as to at least solve the problems of complex and high cost in controlling smart home devices in the prior art.

According to one aspect of an embodiment of the present application, there is provided a method for controlling a device, the method comprising: receiving a data stream including data for playing audio; acquiring reference data corresponding to a device control command controlling the device to perform one or more functions; determining whether at least a portion of the data in the data stream matches the reference data; and in case at least a portion of the data in the data stream matches the reference data, controlling the device to perform one or more of the functions according to the corresponding device control command.

In this way, a device can be controlled by the corresponding device control command including the data matching the reference data without using a separate controller, thus saving costs.

In an exemplary embodiment, the method further includes transmitting the data stream to an audio playback apparatus to control the audio playback apparatus to play the audio.

In this way, it is possible to control the audio playback apparatus to play audio while controlling the device.

In an exemplary embodiment, the reference data includes at least one of: one or more characteristic audio data; a control data sequence indicating that a command for controlling the playback of audio is input according to a predetermined rule; and other characteristic data in the data for playing audio.

In this way, reference data is provided as a basis for data comparison to determine device control commands.

In an exemplary embodiment, in the case where the reference data includes one or more of the characteristic audio data, determining whether at least a portion of the data stream matches the reference data further comprises performing speech recognition on at least a portion of the data stream to acquire speech data; and determining whether the acquired voice data matches one or more of the characteristic audio data.

In this way, the user can control the device by voice.

In an exemplary embodiment, the frequency of the audio in one or more of the characteristic audio data is a frequency of 20 Hz to 20 kHz or a frequency of ultrasonic waves.

In this way, a frequency range that can be used to control the audio of the device is set.

In an exemplary embodiment, the data stream is a data stream of pre-recorded audio or a data stream of audio acquired by a microphone device.

In this way, the acquisition methods of audio capable of controlling the device may be diversified.

In an exemplary embodiment, the control data sequence indicates at least one of: one or more commands of play, pause, previous song and next song are continuously entered multiple times within a predetermined time; and a button indicating the input of one or more commands of play, pause, previous song and next song is pressed for more than a predetermined time.

In this way, the device can be controlled by a special input pattern of commands to control the audio playback apparatus.

In an exemplary embodiment, the device is a lamp, and the device control command includes a command instructing the lamp to perform one or more of the functions of turning on, turning off, brighter and dimmer and color adjustment.

In this way, it is possible to provide a lamp controlled by a command controlling the audio playback apparatus.

In accordance with another aspect of that embodiment of the present application, there is also provided an apparatus for control the device, the apparatus comprising: a data stream receiving module configured to receive a data stream including data for playing audio; a reference data acquisition module configured to acquire reference data corresponding to a device control command controlling the device to perform one or more functions; a comparison module configured to determine whether at least a portion of the data in the data stream matches the reference data; and a device control module configured to control the device to perform one or more of the functions according to the corresponding device control command in case at least a portion of the data in the data stream matches the reference data.

In this way, a device can be controlled by the corresponding device control command including the data matching the reference data without using a separate controller, thus saving costs.

In an exemplary embodiment, the apparatus further includes an audio playback apparatus control module configured to send the data stream to an audio playback apparatus to control the audio playback apparatus to play the audio.

In this way, it is possible to control the audio playback apparatus to play audio while controlling the device.

In an exemplary embodiment, the reference data includes at least one of: one or more characteristic audio data; a control data sequence indicating that a command for controlling the playback of audio is input according to a predetermined rule; and other characteristic data in the data for playing audio.

In this way, reference data is provided as a basis for data comparison to determine device control commands.

In an exemplary embodiment, the device further comprises a speech recognition module, wherein, in a case where the reference data includes one or more of the characteristic audio data, determining whether at least a portion of the data in the data stream matches the reference data further comprises: performing, by the speech recognition module, speech recognition on at least a portion of the data in the data stream to acquire speech data; and determining, by the comparison module, whether the acquired voice data matches one or more of the characteristic audio data.

In this way, the user can control the device by voice.

In an exemplary embodiment, the frequency of the audio in one or more of the characteristic audio data is a frequency of 20 Hz to 20 kHz or a frequency of ultrasonic waves.

In this way, a frequency range that can be used to control the audio of the device is set.

In an exemplary embodiment, the data stream is a data stream of pre-recorded audio or a data stream of audio acquired by a microphone device.

In this way, the acquisition methods of audio capable of controlling the device may be diversified.

In an exemplary embodiment, the control data sequence indicates at least one of: one or more commands of play, pause, previous song and next song are continuously input multiple times within a predetermined time; and a button indicating the input of one or more commands of play, pause, previous song and next song is pressed for more than a predetermined time.

In this way, the device can be controlled by a special input pattern of commands to control the audio playback apparatus.

In an exemplary embodiment, the device is a lamp, and the device control command includes a command instructing the lamp to perform one or more of the functions of turning on, turning off, brighter, dimmer and color adjustment.

In this way, it is possible to provide a lamp controlled by a command controlling the audio playback apparatus.

According to another aspect of embodiments of the present application, there is also provided a smart home device comprising: an audio playback apparatus configured to play audio based on a data stream, the data stream including data operable to control the audio playback apparatus to play audio; a device configured to perform one or more functions in accordance with a device control command; and an apparatus for controlling the device, the device is communicated with the audio playing device, the apparatus comprises a data stream receiving module configured to receive the data stream; a reference data acquisition module configured to acquire reference data corresponding to a device control command controlling the device to perform one or more of the functions; a comparison module configured to determine whether at least a portion of the data in the data stream matches the reference data; and a device control module configured to control the device to perform one or more of the functions according to the corresponding device control command in case at least a portion of the data in the data stream matches the reference data.

In this way, the smart home device including the audio playback apparatus and the device can be controlled only by a controller controlling the audio playback apparatus without providing an additional separate controller for the device, thus saving costs.

In an exemplary embodiment, the apparatus for controlling the device further includes an audio playback apparatus control module configured to send the data stream to the audio playback apparatus to control the audio playback apparatus to play the audio.

In this way, the functions of the smart home device including the audio playback apparatus and the device can be controlled by one controller.

In an exemplary embodiment, the device is a lamp, and the device control command includes a command instructing the lamp to perform one or more of the functions of turning on, turning off, brighter, dimmer and color adjustment.

In this way, it is possible to provide a smart home device including an audio playback apparatus and a lamp controlled by a command controlling the audio playback apparatus.

According to another aspect of the embodiments of the present application, there is also provided a smart home system comprising: one or more audio playback apparatus configured to play audio based on a data stream, the data stream including data for the audio playback apparatus to play audio; one or more devices configured to perform one or more functions in accordance with device control commands; and an apparatus for controlling the device, the apparatus comprising: a data stream receiving module configured to receive the data stream; a reference data acquisition module configured to acquire reference data corresponding to a device control command controlling the one or more devices to perform one or more of the functions; a comparison module configured to determine whether at least a portion of the data in the data stream matches the reference data; a device control module configured to control, in case at least a portion of the data in the data stream matches the reference data, the one or more device to perform one or more of the functions according to the corresponding device control command; and an audio playback apparatus control module configured to send the data stream to the one or more audio playback apparatus to control the one or more audio playback apparatus to play the audio; and data stream transmission device configured to transmit the data stream to the apparatus for controlling the device.

In this way, the audio playback apparatus and one or more devices in the smart home system can be controlled by the corresponding device control command including the data matching the reference data without using a separate controller, thus saving costs In an exemplary embodiment, a plurality of the devices are interconnected with a first wireless network, and the device control command is mutually transmitted by the first wireless network; and a plurality of the audio playback apparatus are interconnected with a second wireless network, and the data stream is mutually transmitted by the second wireless network. In this way, a plurality of devices and audio playback apparatus can be connected by network to realize simultaneously control of the plurality of devices and audio playback apparatus.

According to another aspect of the embodiments of the present application, there is also provided a storage medium storing a program, when the program is executed by a computing device including the storage medium, causing the computing device to perform the above method.

In this way, the device communicatively connected to the audio playback apparatus can be controlled by the corresponding device control command including the data matching the reference data without using a separate controller, thus saving costs.

In the embodiments of the present application, a technical scheme is provided, in which a remote controller is provided which eliminates the need for a separate control device, with the use of the means for controlling the audio playback apparatus, detecting whether the data stream used to control the audio playback apparatus includes data matching a predetermined audio stream or a control command sequence, controlling the device according to the corresponding device control command, which at least solves the technical problems of complex and high cost in controlling the smart home device, and realizes the technical effects of simplifying the design of the smart home system and saving the cost for smart home controlling.

DESCRIPTION OF THE DRAWINGS

The accompanying drawings illustrated herein serve to provide a further understanding of and form a part of the application, and the illustrative embodiments and descriptions thereof serve to explain the application and do not constitute an undue limitation of the application. In the drawings.

DESCRIPTION OF THE DRAWINGS

S101, S103, S105, S107: steps;
1. smart home device;
2: data stream transmission device;
10: apparatus for controlling device;
1. 101: data stream receive module;
2. 103: reference data acquisition module;
3. 105: comparison module;
4. 107: device control module;
5. 109: audio playback apparatus control module;
6. 111: speech recognition module;
20: device;
30: audio playback apparatus.

DETAILED DESCRIPTION

In order for the present application to be better understood by those skilled in the art, a clear and complete description of the present application embodiments will be given below in connection with the accompanying drawings in the embodiments of the present application, and it will be apparent that the described embodiments are only part of the embodiments of the present application, and not all of the embodiments. Based on the embodiments in this application, all other embodiments obtained by those of ordinary skill in the art without creative work should fall within the scope of protection of this application.

It should be noted that the terms "first", "second" and the like in the specification and claims of the present application and the above-mentioned drawings are used to distinguish similar objects and need not be used to describe a specific order or sequence. It should be understood that the data thus used can be interchanged where appropriate so that the embodiments of the present application described herein can be implemented in an order other than those illustrated or described herein. Further, as to the terms "comprising" and "having" and any variations thereof, the intention is to override non-exclusive inclusions, For example, a process, method, system, product or device that includes a series of steps or modules or units is not necessarily limited to those steps or modules or units that are clearly listed, but may include other steps or modules or units that are not clearly listed or are inherent to these processes, methods, products or devices.

A system having a wireless audio processor may include a system and a wireless speaker. The control of the system can be realized by using a remote controller, such as a wireless remote controller such as an infrared remote controller. The control of the wireless speaker can be realized by using a general audio player, such as software such as APP installed on a smart phone to play audio.

The system corresponds to one example of a device capable of performing one or more functions, and the wireless speaker corresponds to one example of an audio playback apparatus.

As use herein, the dependency on the remote control provided separately for the device is removed, For a system with a wireless audio processor (e.g., a smart home device), functional modules are added to identify characteristic audio or commands, and control of the entire system with a wireless audio processor is realized by controlling a remote controller of an audio playback apparatus (e.g., a smart phone equipped with an APP that plays audio). This control method is simple and low in cost.

Figure 1:
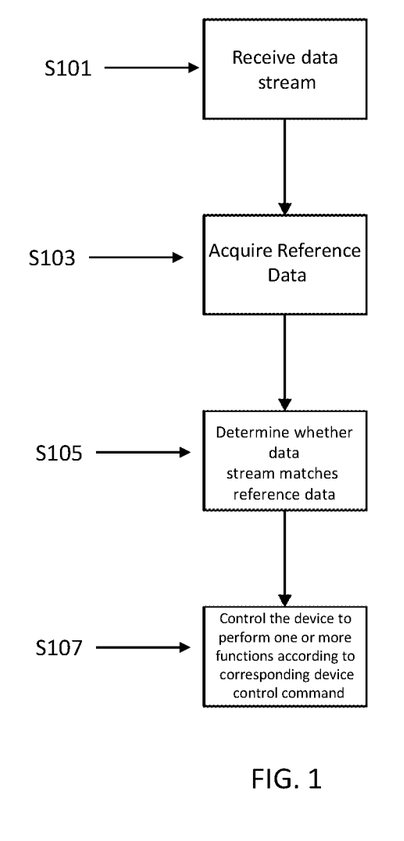
FIG. 1 is a flowchart of a method for controlling a device according to an embodiment of the present application.

According to one aspect of an embodiment of the present application, a method for controlling a device is provided. FIG. 1 is a flowchart of a method for controlling a device according to an embodiment of the present application. As shown in FIG. 1, the method includes steps S101, S103, S105, and S107.

Step S101 includes receiving a data stream including data for playing audio. Step S103 includes acquiring reference data corresponding to a device control command controlling the device to perform one or more functions. Step S105 includes determining whether at least a portion of the data in the data stream matches the reference data. Step S107 includes controlling, in case at least a portion of the data in the data stream matches the reference data, the device to perform one or more of the functions according to the corresponding device control command.

In this way, a device can be controlled by the corresponding device control command including the data matching the reference data without using a separate controller, thus saving costs.

In an exemplary embodiment, the method further includes transmitting the data stream to an audio playback apparatus to control the audio playback apparatus to play the audio.

In this way, it is possible to control the audio playback apparatus to play audio while controlling the device.

In an exemplary embodiment, the reference data includes at least one of: one or more characteristic audio data; a control data sequence indicating that a command for controlling the playback of audio is input according to a predetermined rule; and other characteristic data in the data for playing audio, such as format code of a file and preserved bit information.

In this way, reference data is provided as a basis for data comparison to determine device control commands.

In an exemplary embodiment, in the case where the reference data includes one or more of the characteristic audio data, determining whether at least a portion of the data stream matches the reference data further comprises performing speech recognition on at least a portion of the data stream to acquire speech data; and determining whether the acquired voice data matches one or more of the characteristic audio data.

In this way, the user can control the device by voice.

In an exemplary embodiment, the frequency of the audio in one or more of the characteristic audio data is a frequency of 20 Hz to 20 kHz or a frequency of ultrasonic waves.

In this way, a frequency range that can be used to control the audio of the device is set.

In an exemplary embodiment, the data stream is a data stream of pre-recorded audio or a data stream of audio acquired by a microphone device.

In this way, the acquisition methods of audio capable of controlling the device may be diversified.

In an exemplary embodiment, the control data sequence indicates at least one of: one or more commands of play, pause, previous song and next song are continuously entered multiple times within a predetermined time; and a button indicating the input of one or more commands of play, pause, previous song and next song is pressed for more than a predetermined time.

In this way, the device can be controlled by a special input pattern of commands to control the audio playback apparatus.

In an exemplary embodiment, the device is a lamp, and the device control command includes a command instructing the lamp to perform one or more of the functions of turning on, turning off, brighter, dimmer and color adjustment.

In this way, it is possible to provide a lamp controlled by a command controlling the audio playback apparatus.

Figure 2:
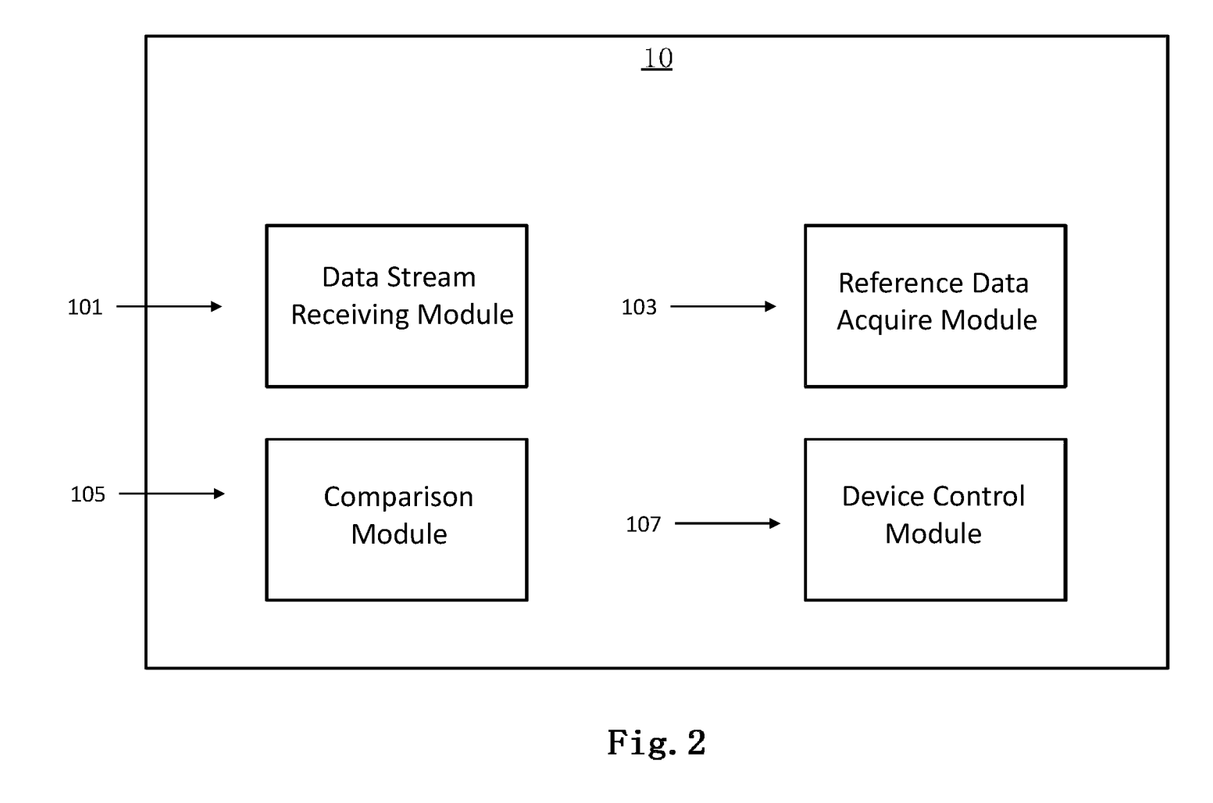
FIG. 2 is a block diagram of an apparatus for controlling a device according to an embodiment of the present application.

According to an embodiment of the present application, there is also provided an apparatus for controlling the device. FIG. 2 is a block diagram of an apparatus for controlling a device according to an embodiment of the present application. As shown in FIG. 2, the apparatus 10 include a data stream receiving module 101, a reference data acquire module 103, a comparison module 105, and a device control module 107.

The data stream receiving module 101 is configured to receive a data stream including data for playing audio. The reference data acquisition module 103 is configured to acquire reference data corresponding to a device control command controlling the device to perform one or more functions. The comparison module 105 is configured to determine whether at least a portion of the data in the data stream matches the reference data. The device control module 107 is configured to control the device to perform one or more functions according to the corresponding device control command in case at least a portion of the data in the data stream matches the reference data.

In this way, a device can be controlled by the corresponding device control command including the data matching the reference data without using a separate controller, thus saving costs.

Figure 3:
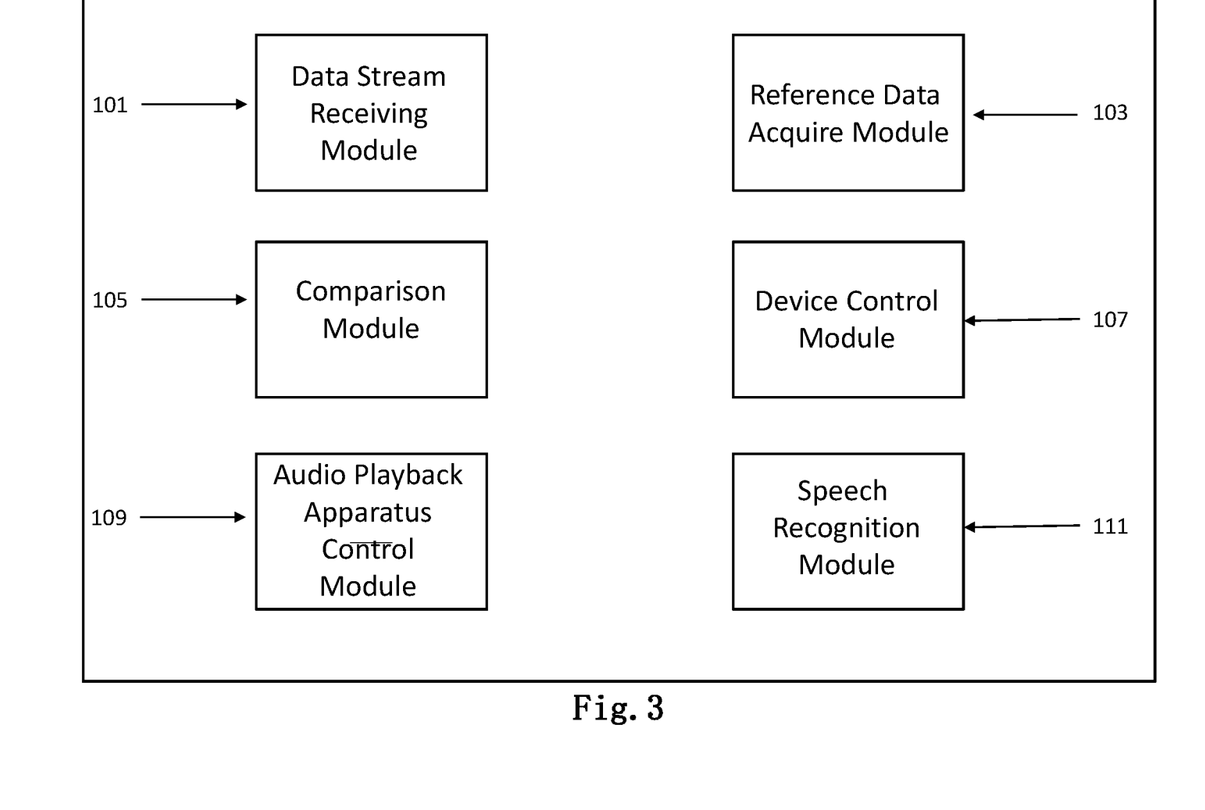
FIG. 3 is a block diagram of an apparatus for controlling a device according to an exemplary embodiment of the present application.

FIG. 3 is a block diagram of an apparatus for controlling a device according to an exemplary embodiment of the present application. In an exemplary embodiment according to the present application, the apparatus 10 further includes an audio playback apparatus control module 109. The audio playback apparatus control module 109 is configured to send a data stream to the audio playback apparatus to control the audio playback apparatus to play audio.

In this way, it is possible to control the audio playback apparatus to play audio while controlling the device.

In an exemplary embodiment, the reference data includes at least one of: one or more characteristic audio data; a control data sequence indicating that a command for controlling the playback of audio is input according to a predetermined rule; and other characteristic data in the data for playing audio.

In this way, reference data is provided as a basis for data comparison to determine device control commands.

FIG. 3 is a block diagram of an apparatus for controlling a device according to an exemplary embodiment of the present application. In an exemplary embodiment according to the present application, the apparatus 10 further includes a speech recognition module 111. In the case where the reference data includes one or more characteristic audio data, determining whether at least a portion of the data in the data stream matches the reference data further comprises performing, by the speech recognition module 111, speech recognition on at least a portion of the data in the data stream to acquire speech data; and determining, by the comparison module 105, whether the acquired voice data matches the one or more characteristic audio data.

In this way, the user can control the device by voice.

For example, in an embodiment where the smart home device is a speaker lamp, the speaker lamp includes a speaker and a lamp, the speaker corresponding to an audio playback apparatus, and the lamp corresponding to the device to be controlled. A user can turn on the general audio player installed on the smart phone, wherein the audio can be controlled through the general audio player. For example, the user turns on the recording function of the smartphone, and say "horn lamp, turn off the light", "horn lamp, turn on the light", "horn lamp, brighter", "horn lamp, dimmer", "blue light", "red light" and so on, the data stream of the voice is sent from the user's smart phone to the speaker lamp, and the speech recognition module of the audio lamp performs speech recognition on the data stream so as to extract the recognized characteristic audio of the user's voice, and then compares the characteristic audio with the preset characteristic audio data through the comparison module. If there is a matching comparison result, the device control command corresponding to the matched preset characteristic audio data controls the lamp to perform corresponding functions such as turning off, turning on, brighter, dimmer, turn the light to be blue or red, etc. The adjustment to the color of the light can turn the light into any color, such as blue, red, yellow, green, white and purple, as long as the light is able to generate light in such color, and device control command corresponding to the color has been set. It should be understood that the voice of the user is not restricted, as long as the characteristic audio obtained by speech recognition corresponds to a device control command. As such, the correspondence of the characteristic audio and the device control command can be set according to user's preference or to settings of the device manufacturer.

In an exemplary embodiment, the frequency of the audio in the one or more characteristic audio data is a frequency of 20 Hz to 20 kHz or a frequency of ultrasonic waves. In one exemplary embodiment, audio is the audio of music that the human ear can perceive. In one exemplary embodiment, audio is audio of voice. In one exemplary embodiment, the audio is ultrasonic audio, and when a data stream of ultrasonic audio is sent to an audio playback apparatus and played, the audio is not perceived by a person, but control of the device may be realized according to the matching of the audio with characteristic audio data.

In this way, a frequency range that can be used to control the audio of the device is set.

In an exemplary embodiment, the data stream is a data stream of pre-recorded audio or a data stream of audio acquired by a microphone device. For example, the data stream can be an audio data stream downloaded from the network, the audio data stream can be brought by the app when installing the audio playback app, the user can record it through the microphone of the smart phone, or the user can pre-record it and then store it in the smart phone. In other words, when the user turns on a general audio player, for example, executed by a smart phone, it is sufficient to be able to transmit the data stream including audio to an audio playback apparatus, for example, including a speaker.

In this way, the acquisition methods of audio capable of controlling the device may be diversified.

In an exemplary embodiment, the control data sequence indicates at least one of: one or more commands of play, pause, previous song and next song are continuously input multiple times within a predetermined time; and a button indicating the input of one or more commands of play, pause, previous song and next song is pressed for more than a predetermined time.

In an exemplary embodiment, the user may quickly click one or more of the play/pause button, the previous song button, the next song button twice or more in the general audio player, and may send corresponding predetermined control instructions to the device, e.g., to control lights on, off, brighter, dimmer, and color adjustments, etc. As to the operation of "quickly" clicking, it can be defined as a button is continuously clicked or an instruction is continuously input within a predetermined period of time.

For example, the user may control the light to switch between respective colors by operating the button as described above, or directly set the lighting to a specific color according to a specific button operation pattern.

In an exemplary embodiment, the user may click any of the play/pause button, the previous song button, the next song button in the general audio player for 2 seconds or more to send corresponding predetermined control instructions to the device, e.g., to control lights on, off, brighter, dimmer, etc.

It should be noted that the lighting control of the lamp is only an example. The lamp can be replaced with an intelligent device that performs other functions.

In this way, the device can be controlled by a special input pattern of commands to control the audio playback apparatus.

In an exemplary embodiment, the device is a lamp, and the device control command includes a command instructing the lamp to perform one or more of the functions of turning on, turning off, brighter, dimmer and color adjustment.

In this way, it is possible to provide a lamp controlled by a command controlling the audio playback apparatus.

Figure 4:
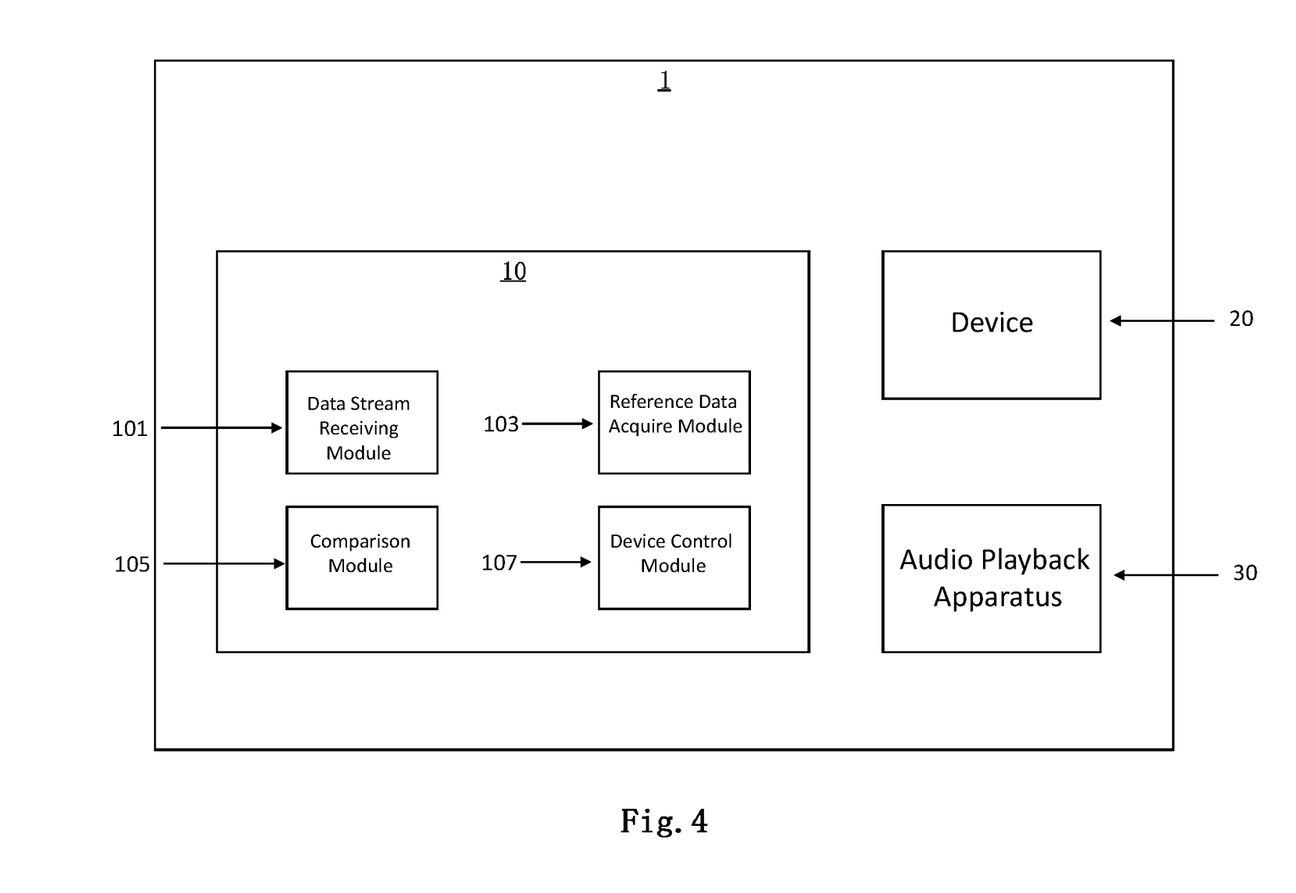
FIG. 4 is a block diagram of a smart home device according to an embodiment of the present application.

A smart home device is also provided in accordance with embodiments of the present application. FIG. 4 is a block diagram of a smart home device according to an embodiment of the present application. As shown in FIG. 4, the smart home device 1 includes an audio playback apparatus 30, a device 20, and an apparatus 10 for controlling the device 20.

The audio playback apparatus 30 is configured to play audio based on a data stream that includes data for the audio playback apparatus 30 to play audio. The device 20 is configured to perform one or more functions in accordance with a device control command. The device 20 is in communication with the audio playback apparatus 30. The apparatus 10 to control the devices 20 comprises a data stream receiving module 101, a reference data acquiring module 103, a comparison module 105 and a device control module 107.

The data stream receiving module 101 is configured to receive a data stream. The reference data acquisition module 103 is configured to acquire reference data corresponding to a device control command controlling the device to perform one or more functions. The comparison module 105 is configured to determine whether at least a portion of the data in the data stream matches the reference data. The device control module 107 is configured to control the device to perform one or more functions according to the corresponding device control command in case at least a portion of the data in the data stream matches the reference data.

In this way, the smart home device including the audio playback apparatus and the device can be controlled only by a controller controlling the audio playback apparatus without providing an additional separate controller for the device, thus saving costs.

In an exemplary embodiment, the apparatus 10 to control the devices 20 further includes an audio playback apparatus control module configured to send a data stream to the audio playback apparatus to control the audio playback apparatus to play audio.

In this way, the functions of the smart home device including the audio playback apparatus and the device can be controlled by one controller.

In an exemplary embodiment, the device is a lamp, and the device control command includes a command instructing the lamp to perform one or more of the functions of turning on, turning off, brighter, dimmer and color adjustment.

In one exemplary embodiment, the smart home device is a speaker lamp, wherein the speaker lamp includes a speaker and a lamp, the lamp corresponding to the device 20 in FIG. 4, and the speaker corresponding to the audio playback apparatus 30 in FIG. 4.

In other exemplary embodiments, the device 20 may also be other devices, such as home appliances such as air conditioners, televisions, fans, etc.

In this way, it is possible to provide a smart home device including an audio playback apparatus and a lamp controlled by a command controlling the audio playback apparatus.

A smart home device according to an embodiment of the present application includes an apparatus controlling the device according to the embodiment of the present application as taught above, and a method for executing the method for controlling the device according to the embodiment of the present application as taught above, which will not be described here in detail.

Figure 5:
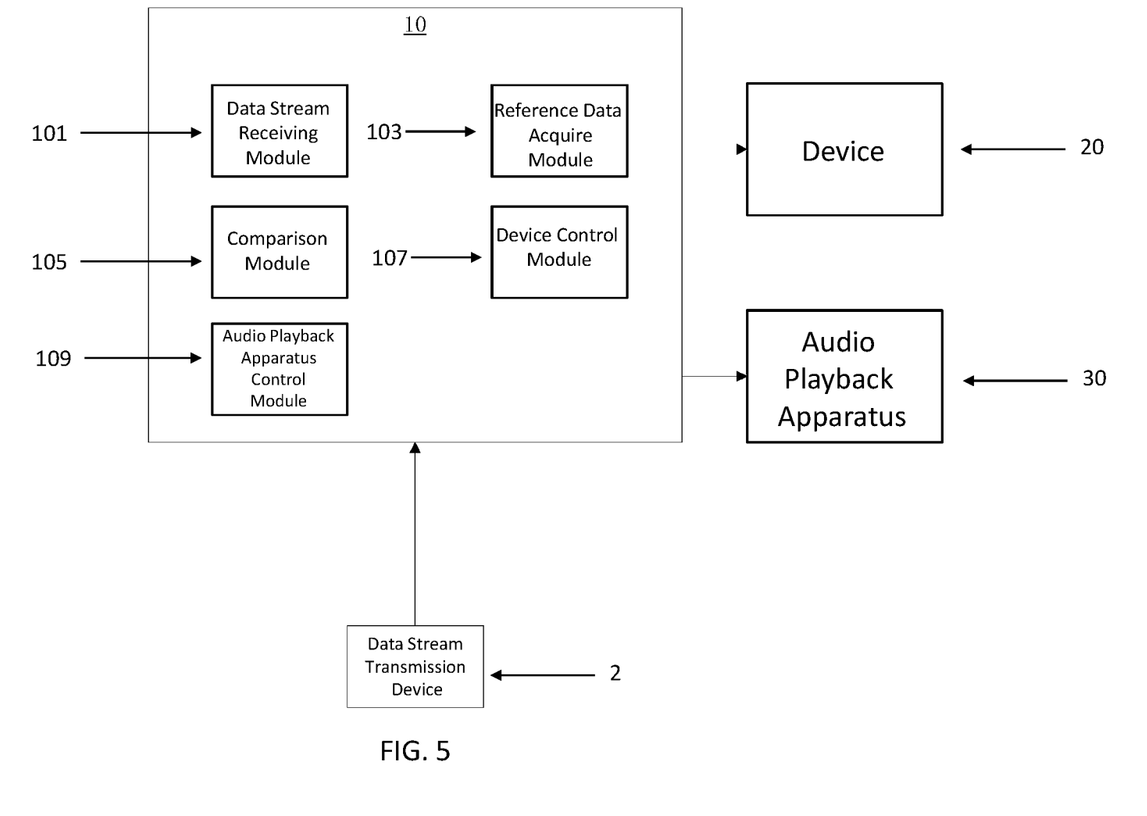
FIG. 5 is a block diagram of a smart home system according to an embodiment of the present application.

According to an embodiment of the present application, a smart home system is further provided. FIG. 5 is a block diagram of a smart home system according to an embodiment of the present application. As shown in FIG. 5, the smart home system according to an embodiment of the present application includes one or more audio playback apparatus 30, one or more devices 20, an apparatus 10 to control the devices, and a data stream transmission device 2.

The audio playback apparatus 30 is configured to play audio based on a data stream including data for the audio playback apparatus 30 to play audio.

The one or more devices 20 are configured to perform one or more functions according to a device control command.

The data stream transmission device 2 is configured to transmit a data stream to the apparatus 10 to control the devices 20. In an exemplary embodiment, the data stream transmission device 2 is an intelligent apparatus, such as a smart phone, a PC, or a wireless audio playing controller, installed with one or more of audio playing software (or APP), recording software, microphone, and capable of wirelessly transmitting the data stream according to the present application.

The apparatus 10 to control the devices 20 includes a data stream receiving module 101, a reference data acquisition module 103, a comparison module 105, a device control module 107, and an audio playback apparatus control module 109.

The data stream receiving module 101 is configured to receive a data stream. The reference data acquisition module 103 is configured to acquire reference data corresponding to device control commands that control one or more devices 20 to perform one or more functions. The comparison module 105 is configured to determine whether at least a portion of the data stream matches the reference data. The device control module 107 is configured to control one or more devices 20 to perform one or more functions according to corresponding device control commands in case at least a portion of the data in the data stream matches the reference data. The audio playback apparatus control module 109 is configured to transmit the data stream to the audio playback apparatus 30 to control the audio playback apparatus 30 to play audio.

For the audio playback apparatus 30, the device 20 and the apparatus 10 according to the embodiments of the present application, reference may be made to the above embodiments, and details are not described herein again.

In the exemplary embodiment of the present application, the audio playback apparatus 30 is a wireless loudspeaker (for example, a Bluetooth loudspeaker). The device 20 may be a lamp or other home apparatus. In an exemplary embodiment, a wireless loudspeaker may be disposed in a housing together with a lamp to constitute an audio playback apparatus 30 provided with the device 20. In another exemplary embodiment, a wireless loudspeaker is provided separately from a lamp. In another exemplary embodiment, one wireless loudspeaker is provided separately from a plurality of lamps arranged separately from each other. In other words, the manner in which the audio playback apparatus 30 and the one or more devices 20 are arranged is not limited in the system as long as the apparatus 10 controlling the device 20 can send a device control command to the one or more devices 20 to control the one or more devices 20 to perform one or more functions, and can send a data stream to the audio playback apparatus 30 to control the audio playback apparatus 30 to play audio. In addition, in an exemplary embodiment, the apparatus 10 to control the devices 20 is collectively arranged with the audio playback apparatus 30, or the apparatus 10 is collectively arranged with any one of the one or more devices 20, for example, the apparatus 10 and the audio playback apparatus 30 are arranged in one housing, or any one of the apparatus 10 and the one or more devices 20 is arranged in one housing.

In an exemplary embodiment, a plurality of devices are interconnected through a first wireless network, and device control commands are transmitted to each other through the first wireless network. A plurality of audio playback apparatus are connected to each other through a second wireless network, and the data streams are transmitted to each other through the second wireless network.

Figure 6:
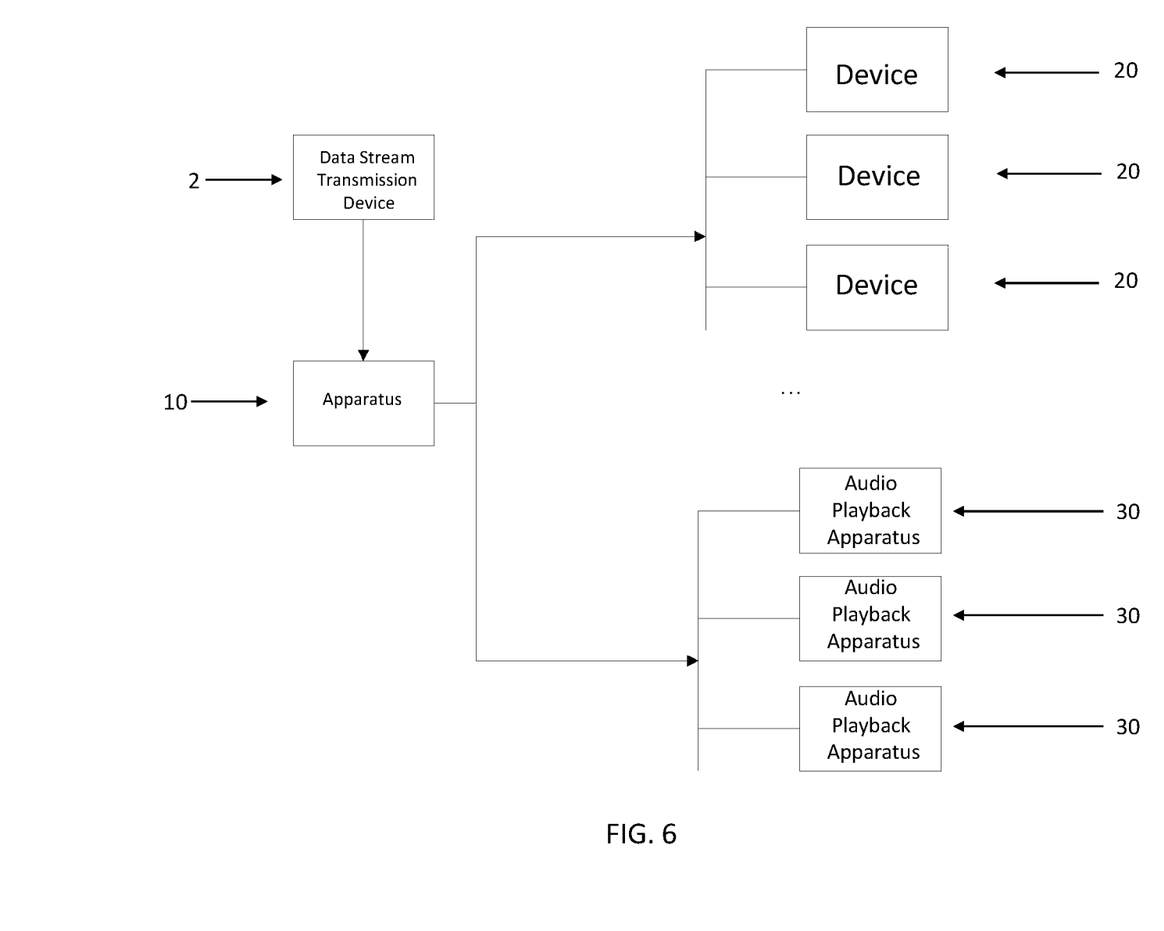
FIG. 6 is a schematic diagram of a smart home system according to an embodiment of the present application in which the audio playback apparatus and the devices are connected by network, respectively.

In the exemplary embodiment of the present application, one or more audio playback apparatus 30 are connected to each other through a wireless network. In an exemplary embodiment of the present application, one or more devices 20 are connected to each other through a wireless network. FIG. 6 is a schematic diagram of a smart home system according to an embodiment of the present application in which the audio playback apparatus and the devices are connected by network, respectively. As shown in FIG. 6, the smart home system includes a plurality of devices 20, a plurality of audio playback apparatus 30, an apparatus 10 for controlling the devices, and a data stream transmission device 2.

The plurality of devices 20 can communicate with each other through a wireless network to implement networking, and control commands from the apparatus 10 can be transmitted between the plurality of devices 20 to enable the plurality of devices 20 to be controlled simultaneously through the apparatus 10. Alternatively, the control commands of the apparatus 10 are transmitted to each device 20 in the network after being transmitted to the network of the plurality of devices 20, enabling the plurality of devices 20 to be simultaneously controlled by the apparatus 10 to perform one or more functions.

The plurality of audio playback apparatus 30 can communicate with each other through a wireless network to implement networking, and can transmit data streams from the apparatus 10 to each other between the plurality of audio playback apparatus 30, so that the plurality of audio playback apparatus 30 can be controlled simultaneously by the apparatus 10 to play audio. Alternatively, after the data stream of the apparatus 10 is transmitted to the network of the plurality of audio playback apparatus 30, the data stream is transmitted to each audio playback apparatus 30 in the network, so that the plurality of audio playback apparatus 30 can be controlled simultaneously by the apparatus 10 to play audio.

For example, the user operates the data stream transmission device 2 to wirelessly send the data stream according to the present application. The apparatus 10 receives and processes a data stream, and sends a device control command of the control device 20 and a data stream for controlling the audio playing apparatus 30 to play audio. The plurality of devices 20 receive device control commands through the networking to perform one or more functions. The plurality of audio playback apparatus 30 receive a data stream through the networking to play audio. For example, one of the plurality of devices 20 (for example, the device 20 closest to the apparatus 10, or the device 20 receiving the strongest signal from the apparatus 10) receives a device control command, and sends the device control command to the plurality of devices 20 within the network through a wireless network between the plurality of devices 20, so that the plurality of devices 20 can be controlled simultaneously. In this way, the user can control the plurality of devices 20 only by operating the data stream transmission device 2 once. One audio playback apparatus 30 (for example, the audio playback apparatus 30 closest to the apparatus 10, or the audio playback apparatus 30 receiving the strongest signal from the apparatus 10, receives a device control command, and send the device control command to the plurality of audio playback apparatus 30 in the network through a wireless network between the plurality of audio playback apparatus 30. The plurality of audio playback apparatus 30 can be controlled at the same time. In this way, the user can control the plurality of audio playback apparatus 30 only by operating the data stream transmission device 2 once. Moreover, even if a portion of the plurality of devices 20 or the plurality of audio playback apparatus 30 cannot directly receive signals from the apparatus 10, all devices 20 or audio playback apparatus 30 may be controlled as long as one device 20 or audio playback apparatus 30 receives signals from the apparatus 10. The wireless networks used for networking the device 20 and the audio playback apparatus 30 are not limited to Wi-Fi, Bluetooth, 4G networks and 5G networks, as long as the networking of the device 20 and the audio playback apparatus 30 can be implemented through the wireless network.

FIG. 6 shows an example in which a plurality of devices 20 and a plurality of audio playback apparatuses 30 are connected through network, respectively. It should be understood that, according to an embodiment of the present application, a smart home system may include a plurality of devices 20 connected through network and an audio playback apparatus 30, or may include a device 20 and a plurality of audio playback apparatuses 30 connected through network. The principle of the networking communication is the same as that in the above embodiment, and is not described herein again.

According to embodiments of the present application, there is also provided a storage medium storing a program, when the program is executed by a computing device including the storage medium, causing the computing device to perform the above method, wherein the computing device is selected from a computer, a smart phone, other devices with an operating system or an embedded system. The computing device may also be any device capable of running the program to perform a corresponding function.

In this way, the device communicatively connected to the audio playback apparatus can be controlled by the corresponding device control command including the data matching the reference data without using a separate controller, thus saving costs.

In the above embodiments of the present application, the description of each embodiment has its own emphasis, and the part not described in detail in one embodiment can be referred to the relevant description of other embodiments.

In several embodiments provided herein, it should be understood that the disclosed art may be implemented in other ways. Among them, the above-described embodiment of the device is only illustrative, for example, the division of the unit or module is only a logical function division, and there may be another division mode when actually implemented, for example, a plurality of units or modules or components may be combined or integrated into another system, or some features may be ignored or not executed. In another point, the coupling or direct coupling or communication connection shown or discussed with each other may be indirect coupling or communication connection through some interface, module or unit, and may be electrical or other form.

The units or modules described as separate components may or may not be physically separated, and the components displayed as units or modules may or may not be physical units or modules, i.e. may be located in one place, or may also be distributed over a plurality of network units or modules. Some or all of the units or modules can be selected according to actual needs to realize the purpose of the embodiment scheme.

In addition, each functional unit or module in each embodiment of the present application may be integrated into one processing unit or module, or each unit or module may exist physically alone, or two or more units or modules may be integrated into one unit or module. The above integrated units or modules can be realized either in the form of hardware or in the form of software functional units or modules.

If the integrated unit is implemented in the form of a software functional unit and sold or used as a separate product, it can be stored in a computer-readable storage medium. Based on this understanding, the technical scheme of the present application can be embodied in the form of software products in essence or in part that contributes to the prior art or in whole or in part of the technical scheme. The computer software product is stored in a storage medium and includes instructions to cause a computer device (which may be a personal computer, server, network device, etc.) to perform all or part of the steps of the method described in various embodiments of the present application. The storage medium includes a USB disk, a read-only memory (ROM, Read-Only Memory), a random access memory (RAM, Random Access Memory), a mobile hard disk, a magnetic disk, an optical disk and other media capable of storing program codes.

The foregoing is only a preferred embodiment of the present application, and it should be noted that a number of modifications and embellishments may be made to those of ordinary skill in the art without departing from the principles of the present application, and such modifications and embellishments should also be considered as the scope of protection of the present application.

What is claimed is:

1. A method for controlling a device, wherein the method comprising:
    receiving a data stream via an apparatus configured to control the device and an audio playback apparatus being in communication with the device, the data stream including data for playing audio;
    transmitting the data stream to the audio playback apparatus to control the audio playback apparatus to play the audio;
    acquiring reference data, via the apparatus, the reference data corresponding to a device control command controlling the device to perform one or more functions;
    determining whether at least a portion of the data in the data stream corresponding to the audio from the audio playback apparatus matches the reference data; and
    controlling, via the corresponding device control command, in case the at least a portion of the data in the data stream matches the reference data, the device to perform the one or more functions according to the corresponding device control command.

2. The method of claim 1, wherein the reference data comprises at least one of:
    one or more characteristic audio data;
    a control data sequence indicating that commands to control playing the audio is input according to a predetermined rule; and
    other characteristic data in the data for playing the audio.

3. The method of claim 2, wherein determining whether at least a portion of the data in the data stream matches the reference data in the case where the reference data comprises the one or more characteristic audio data further comprises:
    performing speech recognition on at least a portion of data in the data stream to acquire speech data; and
    determining whether the acquired speech data matches the one or more characteristic audio data.

4. The method of claim 2, wherein a frequency of the audio in the one or more characteristic audio data is 20 Hz to 20 kHz or a frequency of ultrasonic waves.

5. The method of claim 2, wherein the data stream is a data stream of pre-recorded audio or a data stream of audio acquired by a microphone device.

6. The method of claim 2, wherein the control data sequence indicates at least one of:
    one or more commands of play, pause, previous song and next song are continuously input multiple times within a predetermined time; and a button indicating that the one or more commands of play, pause, previous song and next song are entered is pressed for more than the predetermined time.

7. The method of claim 6, wherein the device is a lamp and the device control command comprises:
a command instructing the lamp to perform the one or more functions of turning on, turning off, brighter, dimmer and color adjustment.

8. An apparatus for controlling a device being in communication with an audio playback apparatus, wherein said apparatus comprises:
a data stream receiving module configured to receive a data stream including data for playing audio;
wherein the data stream is transmitted to the audio playback apparatus to control the audio playback apparatus to play the audio;
a reference data acquisition module configured to acquire reference data corresponding to a device control command controlling the device to perform one or more functions;
a comparison module configured to determine whether at least a portion of the data in the data stream corresponding to the audio from the audio playback apparatus matches the reference data; and
a device control module, which includes the corresponding device control command being configured to control, in case the at least a portion of the data in the data stream matches the reference data, the device to perform the one or more functions according to the corresponding device control command.

9. The apparatus of claim 8, wherein the apparatus further comprises:
an audio playback apparatus control module configured to send the data stream to the audio playback apparatus to control the audio playback apparatus to play the audio.

10. The apparatus of claim 8, wherein the reference data comprises at least one of:
one or more characteristic audio data;
a control data sequence indicating that commands to control playing audio is input according to a predetermined rule; and
other characteristic data in the data for playing audio.

11. The apparatus of claim 10, wherein the apparatus further comprising a speech recognition module, wherein, in the case where the reference data comprises the one or more characteristic audio data, determining whether the at least a portion of the data in the data stream matches the reference data further comprises:
performing, by the speech recognition module, speech recognition on at least a portion of data in the data stream to acquire speech data; and
determining, by the comparison module, whether the acquired speech data matches the one or more characteristic audio data.

12. The apparatus of claim 10, wherein a frequency of the audio in the one or more characteristic audio data is 20 Hz to 20 kHz or a frequency of ultrasonic waves.

13. The apparatus of claim 10, wherein the data stream is a data stream of pre-recorded audio or a data stream of audio acquired by a microphone device.

14. The apparatus of claim 10, wherein the control data sequence indicates at least one of:
one or more commands of play, pause, previous song and next song are continuously input multiple times within a predetermined time; and
a button indicating that the one or more commands of play, pause, previous song and next song are entered is pressed for more than the predetermined time.

15. The apparatus of claim 14, wherein the device is a lamp, and the device control command comprises:
a command instructing the lamp to perform the one or more functions of turning on, turning off, brighter, dimmer and color adjustment.

16. A smart home device comprising:
an audio playback apparatus configured to play audio based on a data stream, the data stream including data for the audio playback apparatus to play audio;
a device being in communication with the audio playback apparatus and configured to perform one or more functions in accordance with device control commands; and
an apparatus for controlling the device, the apparatus comprising:
a data stream receiving module configured to receive the data stream including data for playing audio;
wherein the data stream is transmitted to the audio playback apparatus to control the audio playback apparatus to play the audio;
a reference data acquisition module configured to acquire reference data corresponding to a device control command controlling the device to perform the one or more functions;
a comparison module configured to determine whether at least a portion of the data in the data stream corresponding to the audio from the audio playback apparatus matches the reference data; and
a device control module, which includes the corresponding device control command being configured to control, in case the at least a portion of the data in the data stream matches the reference data, the device to perform the one or more functions according to the corresponding device control command.

17. The smart home device of claim 16, wherein the apparatus for controlling the device further comprises:
an audio playback apparatus control module configured to send the data stream to the audio playback apparatus to control the audio playback apparatus to play the audio.

18. The smart home device of claim 17, wherein the device is a lamp and the device control command comprises:
a command instructing the lamp to perform the one or more functions of turning on, turning off, brighter, dimmer and color adjustment.

19. A smart home system comprising:
one or more audio playback apparatuses configured to play audio based on a data stream, the data stream including data for the one or more audio playback apparatuses to play audio;
one or more devices being in communication with the one or more audio playback apparatuses and configured to perform one or more functions in accordance with device control commands; and
an apparatus for controlling the one or more devices, the apparatus comprising:
a data stream receiving module configured to receive the data stream including data for playing audio;
wherein the data stream is transmitted to the one or more audio playback apparatuses to control the one or more audio playback apparatuses to play the audio;
a reference data acquisition module configured to acquire reference data corresponding to a device control command controlling the one or more devices to perform the one or more functions;

a comparison module configured to determine whether at least a portion of the data in the data stream corresponding to the audio from the one or more audio playback apparatuses matches the reference data;

a device control module, which includes the corresponding device control command being configured to control, in case the at least a portion of the data in the data stream matches the reference data, the one or more devices to perform the one or more functions according to the corresponding device control command; and an audio playback apparatus control module configured to send the data stream to the one or more audio playback apparatuses to control the one or more audio playback apparatuses to play the audio; and a data stream transmission device configured to transmit the data stream to the apparatus for controlling the one or more devices.

20. The smart home system of claim 19, wherein:

the one or more devices are interconnected with a first wireless network, and the device control command is mutually transmitted by the first wireless network; and the one or more audio playback apparatuses are interconnected with a second wireless network, and the data stream is mutually transmitted by the second wireless network.

21. A non-transitory storage medium, wherein said non-transitory storage medium stores a program, when said program is executed by a computing device comprising said non-transitory storage medium, causing said computing device to perform the method according to claim 1.

* * * * *